(12) United States Patent
Wang

(10) Patent No.: US 7,926,606 B2
(45) Date of Patent: Apr. 19, 2011

(54) FIXING DEVICE FOR A FOLDABLE CHASSIS OF AN ELECTRIC WALK-SUBSTITUTING VEHICLE

(76) Inventor: Arthur Wang, Kaohsiung County (TW)

( * ) Notice: Subject to any disclaimer, the term of this patent is extended or adjusted under 35 U.S.C. 154(b) by 261 days.

(21) Appl. No.: 12/320,499

(22) Filed: Jan. 28, 2009

(65) Prior Publication Data

US 2010/0187034 A1      Jul. 29, 2010

(51) Int. Cl.
*B62K 15/00* (2006.01)
(52) U.S. Cl. .................. 180/208; 280/278; 280/287
(58) Field of Classification Search .................. 180/208; 208/278, 287; 296/181.7
See application file for complete search history.

(56) References Cited

U.S. PATENT DOCUMENTS

| | | | |
|---|---|---|---|
| 7,028,799 B2 * | 4/2006 | Lin | 180/208 |
| 2006/0086553 A1 * | 4/2006 | Chen | 180/208 |
| 2008/0309046 A1 * | 12/2008 | Wang | 280/250.1 |
| 2009/0308676 A1 * | 12/2009 | Wang | 180/208 |
| 2010/0126789 A1 * | 5/2010 | Scragg | 180/208 |

* cited by examiner

*Primary Examiner* — Paul N Dickson
*Assistant Examiner* — Drew Brown
(74) *Attorney, Agent, or Firm* — Rosenberg, Klein & Lee

(57) ABSTRACT

A walk-substituting vehicle includes a foldable chassis, a steering mechanism, a seat assembly, and a fixing device, which is movable to a fastening portion to prevent the chassis from folding from an in-use position; the chassis includes a main part and a footrest part; the vehicle can be moved to a folded configuration, wherein the chassis is folded, and the steering mechanism and the seat assembly lie on the chassis; the fixing device includes a pulling member pivoted on the footrest part, a joining member pivoted on the pulling member, and a pushing member joined on and slideable along a receiving recessed portion of the pulling member; when the fixing device is in the fastening position, the joining member will be hooked over the main part of the chassis, and the pushing member engaged with the joining member to prevent the joining member from pivoting relative to the pulling member.

3 Claims, 10 Drawing Sheets

FIXING DEVICE FOR A FOLDABLE CHASSIS OF AN ELECTRIC WALK-SUBSTITUTING VEHICLE

BACKGROUND OF THE INVENTION

1. Field of the Invention

The present invention relates to a fixing device for a foldable chassis of an electric walk-substituting vehicle, more particularly one, which can prevent the chassis from bending or folding when the chassis is in an unfolded in-use position; the walk-substituting vehicle will occupy much less space to be easy to store and transport, and can be easily dragged like a luggage trolley when it is in the folded configuration.

2. Brief Description of the Prior Art

A person is prone to suffer from muscular dystrophy of the legs and physiological deterioration, and become unable to stand up or walk by himself/herself after he/she becomes very old, has injured lower limbs as the result of a traffic accident, has been bedridden for a long time or gets serious sickness such as paralysis of the lower half of the body. Consequently, such a person has to use a crutch or wheelchair to help him/her move. However, crutches can only help those people who still can walk by themselves, and the users still can't move rapidly or a long distance if they have the above-mentioned physical problems. And, it will take one relatively much labor to move a conventional wheelchair when he/she is sitting on the wheelchair.

Therefore, the industry developed various man-carrying vehicles such as electric walk-substituting carts and electric wheelchairs for use by the elderly and physically disabled persons.

However, most of currently-existing man-carrying vehicles can't be reduced or folded to occupy less space for easy transportation and storage. Consequently, such man-carrying vehicles aren't convenient to use.

To overcome the above-mentioned problem, the industry developed a separable man-carrying vehicle, which can be separated into several major components by the users. However, it still takes a certain amount of time and labor to separate the vehicle. Therefore, such a man-carrying vehicle isn't convenient to use, either.

Therefore, it is a main object of the present invention to provide an improvement on an electric walk-substituting vehicle to overcome the above problems.

SUMMARY OF THE INVENTION

An electric walk-substituting vehicle in accordance with an embodiment of the present invention includes a foldable chassis, a steering mechanism, a seat assembly, and a fixing device, which is movable to a fastening portion to prevent the chassis from folding from an unfolded in-use position. The chassis includes a main part and a footrest part pivoted to a front end of the main part. The vehicle can be moved to a folded configuration for easy storage and transportation, wherein the steering mechanism is received in the footrest part, the seat assembly close to an upper side of the main part of the chassis; the fixing device includes a pulling member pivoted on the footrest part, a joining member pivoted on the pulling member, and a pushing member joined on and capable of sliding along a receiving recessed portion of the pulling member; the joining member will be hooked over a detaining protrusion formed on the main part of the chassis, and the pushing member embedded in an embedding recessed portion of the joining member to prevent the joining member from pivoting relative to the pulling member when the fixing device is in the fixing position.

A spring-biased threaded rod is joined on the pivotal joint between the pulling member and the footrest part, and it is threadedly joined to a threaded fixing element; thus, the tightness of the joining member hooked over the detaining protrusion can be adjusted by means of turning the threaded fixing element.

The vehicle further includes an auxiliary handle, and several auxiliary wheels, and therefore can be easily dragged like a luggage trolley in the folded not-in-use configuration.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
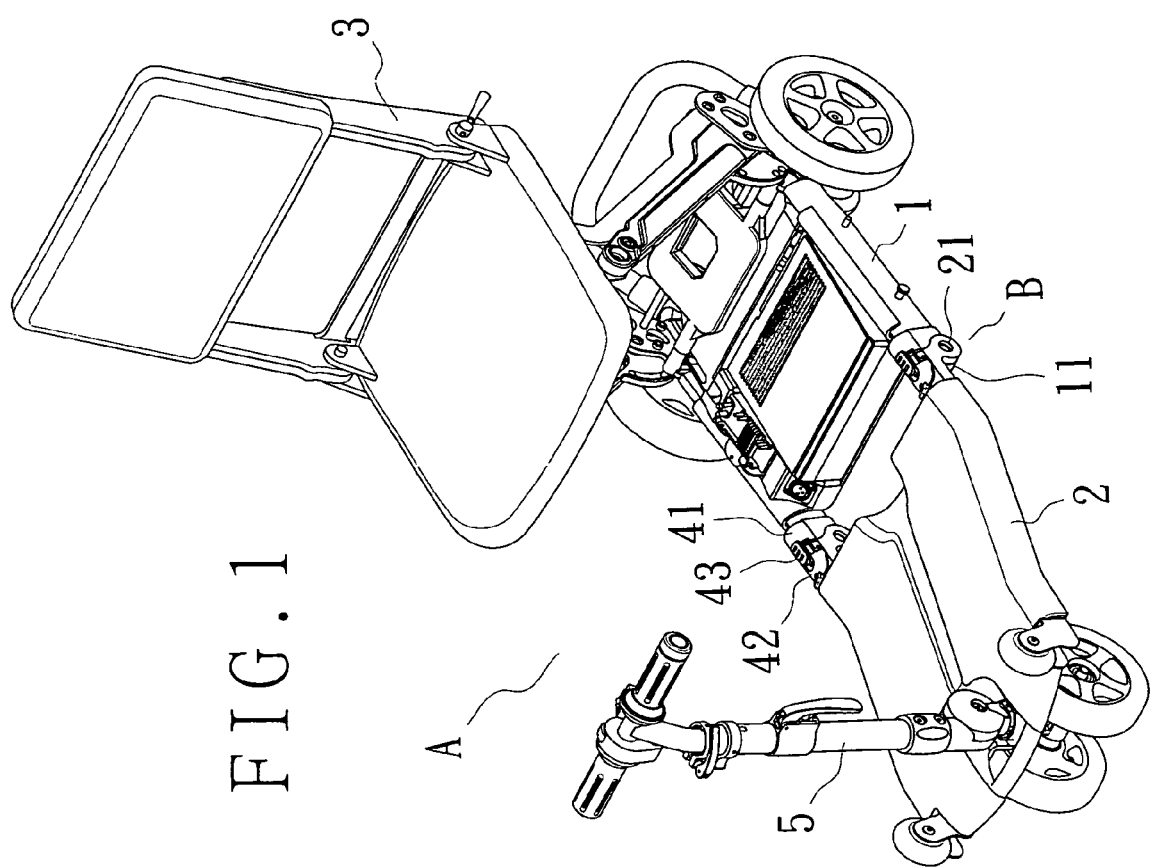
FIG. 1 is a perspective view of a walk-substituting vehicle with the fixing device of the present invention.
Figure 2:
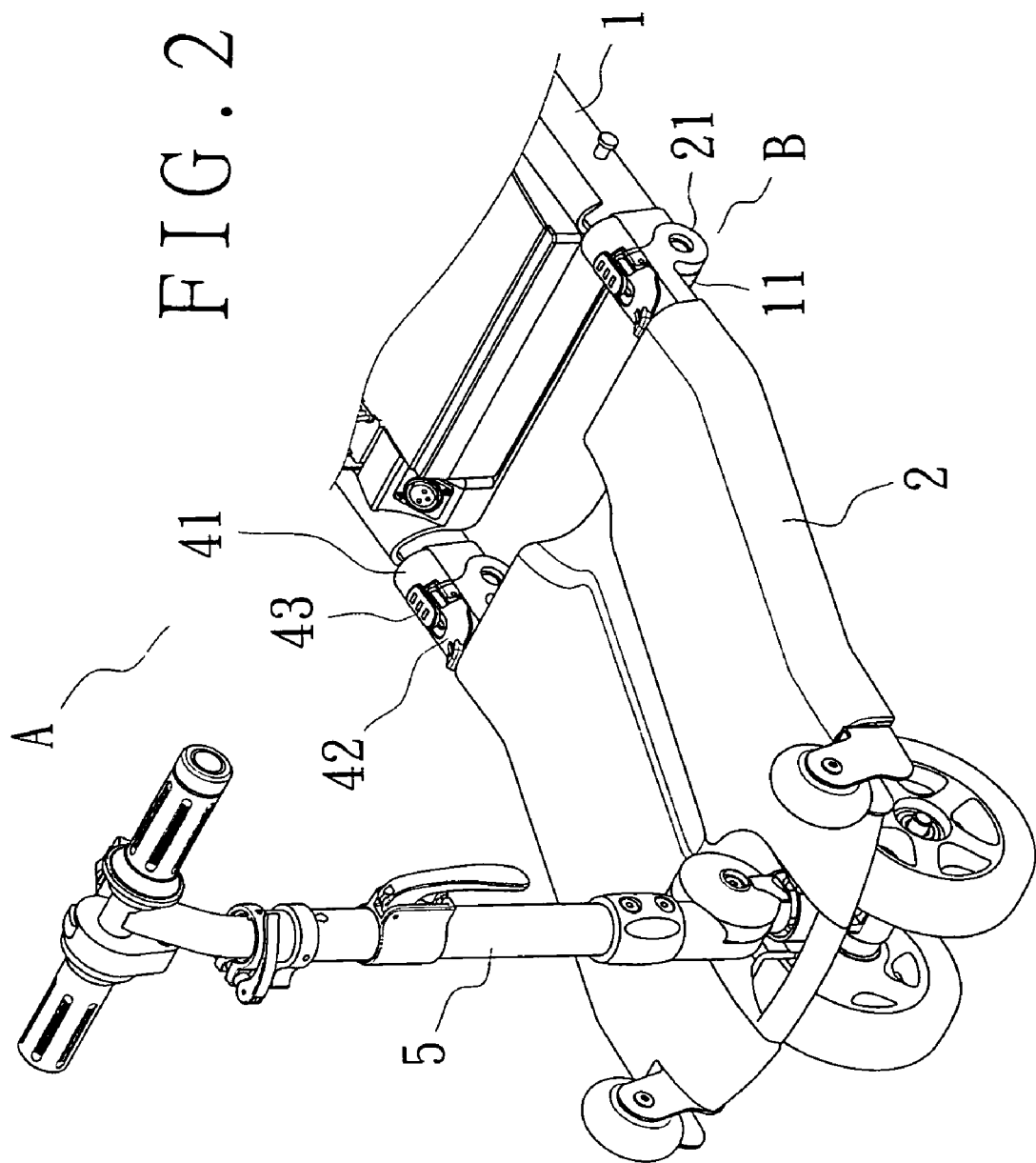
FIG. 2 is a partial perspective view of the vehicle.
Figure 3:
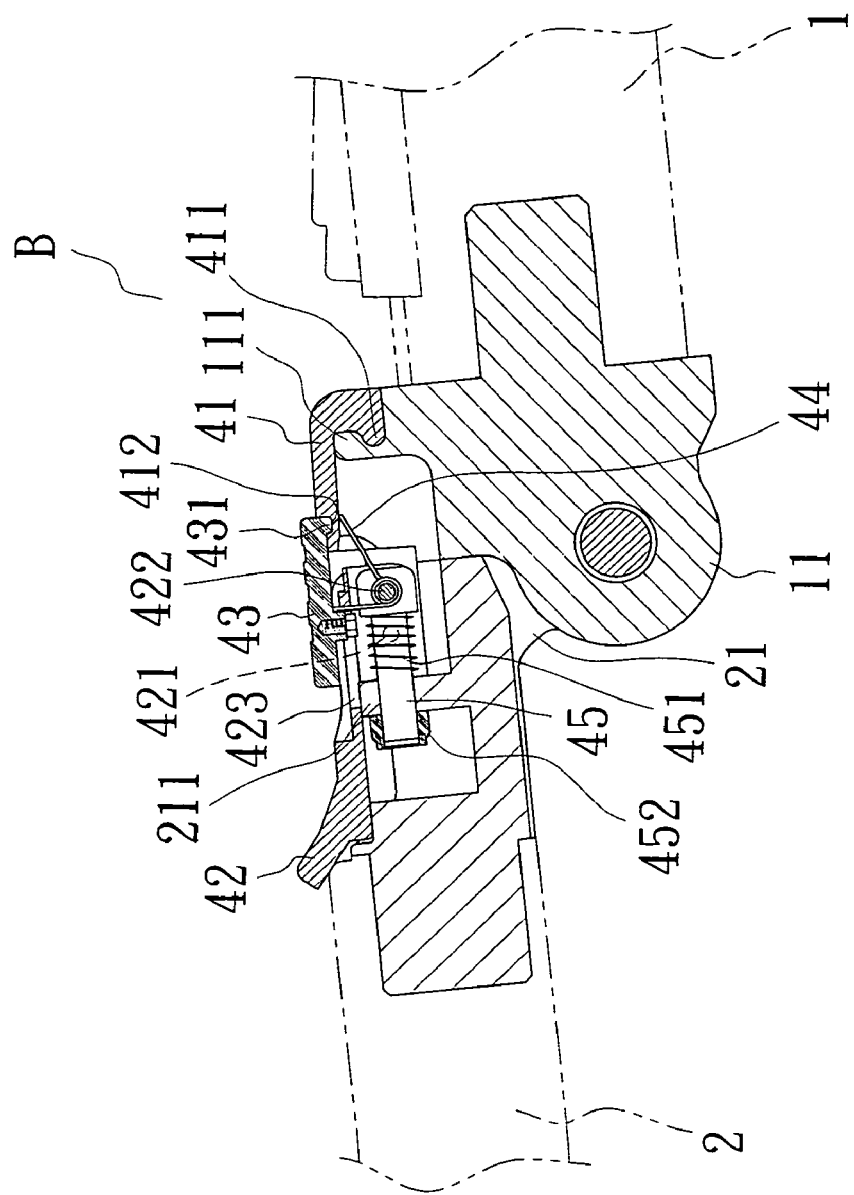
FIG. 3 is a side view of the fixing device, taken when the chassis of the vehicle is in the unfolded position.
Figure 4:
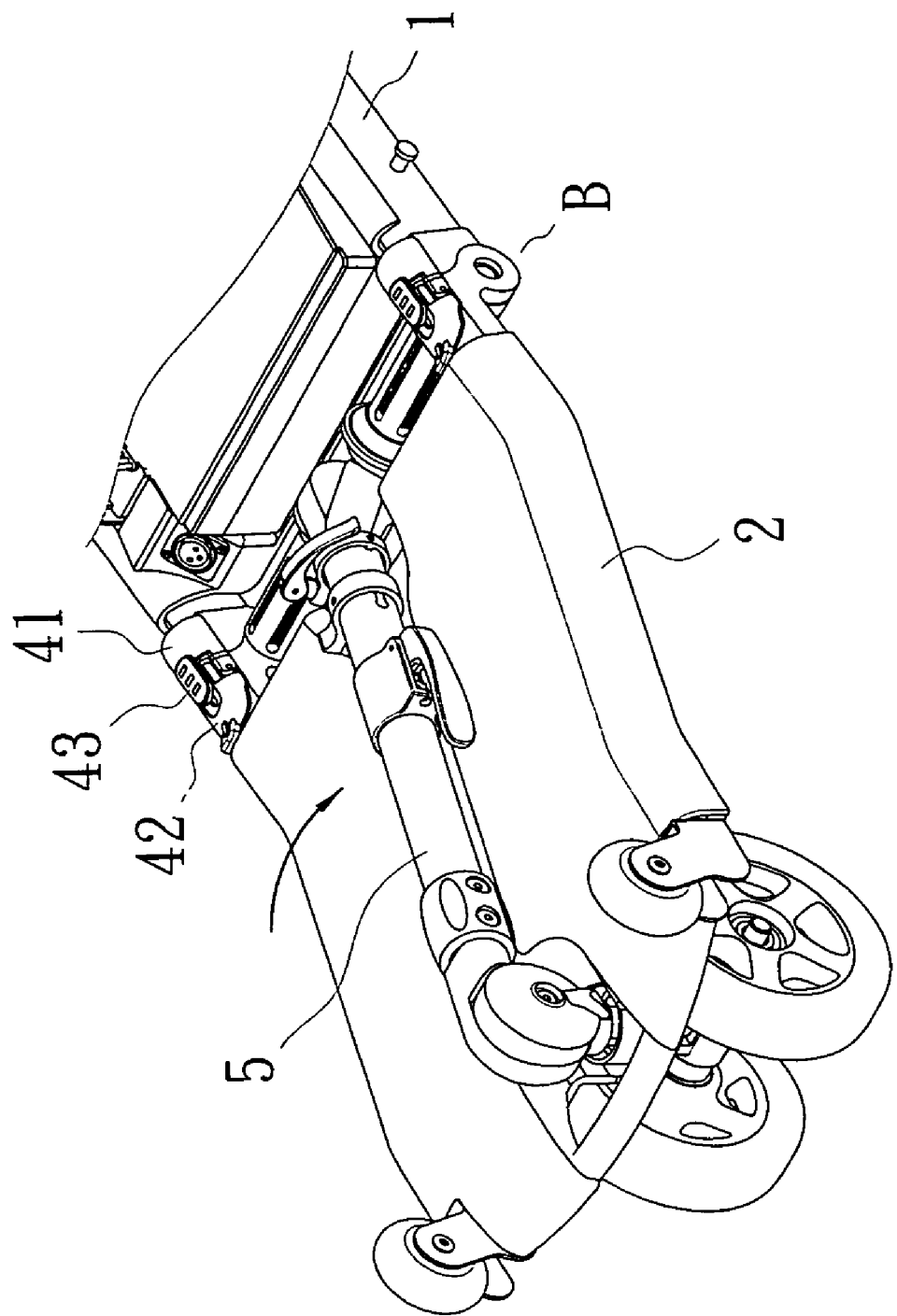
FIG. 4 is a perspective view of the walk-substituting vehicle under a folding action (step one)
Figure 5:
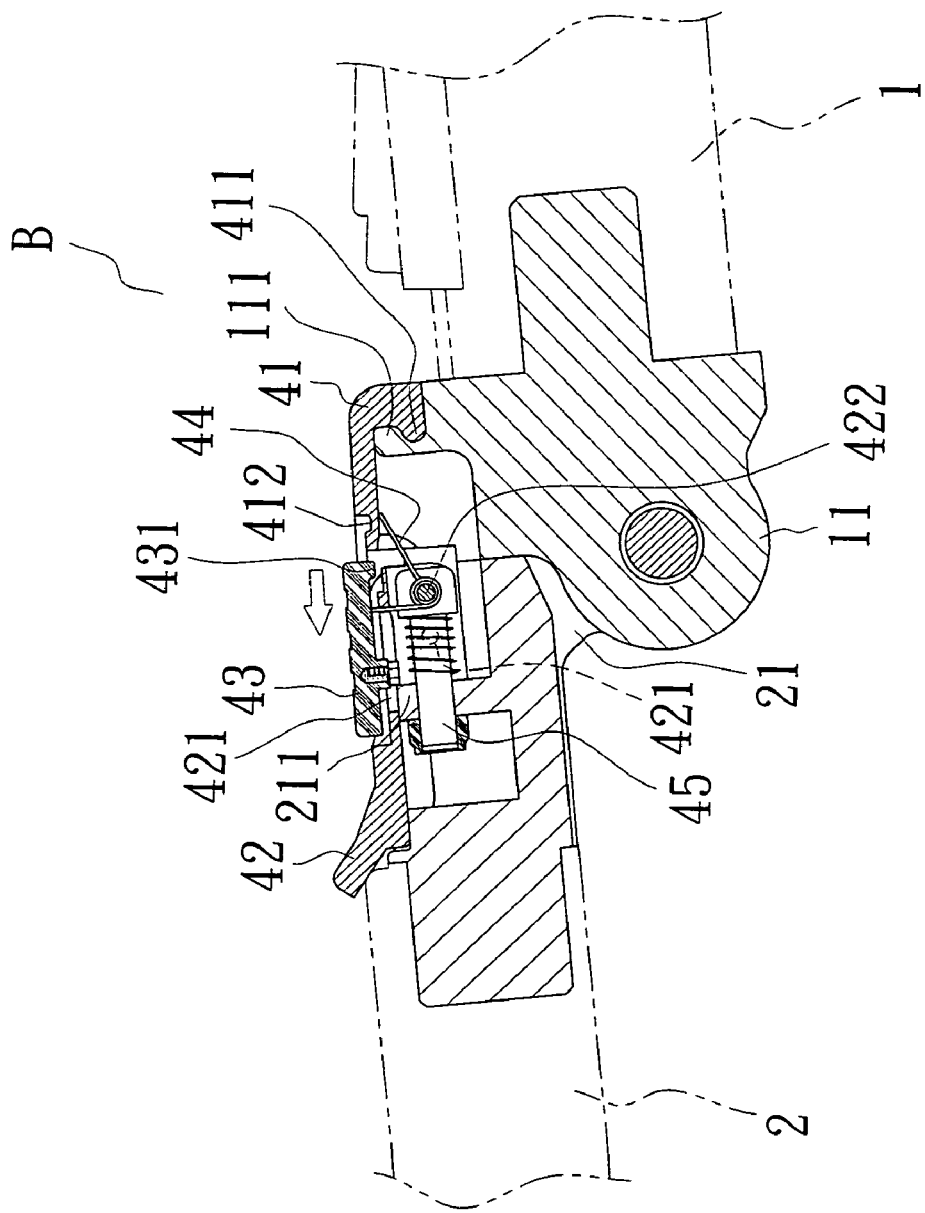
FIG. 5 is a side view of the fixing device, taken when the fixing device is being moved so as to unfasten the chassis (step one)
Figure 6:
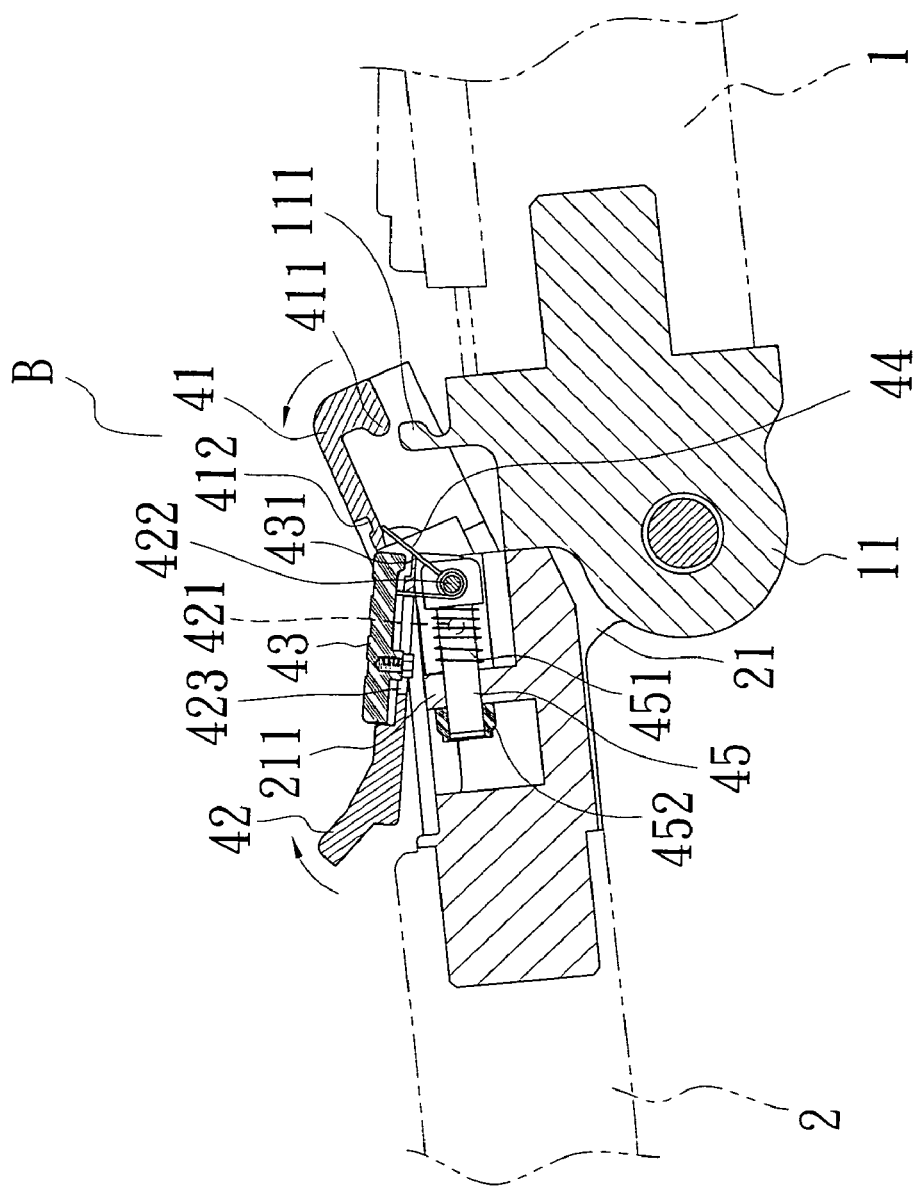
FIG. 6 is a side view of the fixing device, taken when the fixing device is being moved so as to unfasten the chassis (step two)
Figure 7:
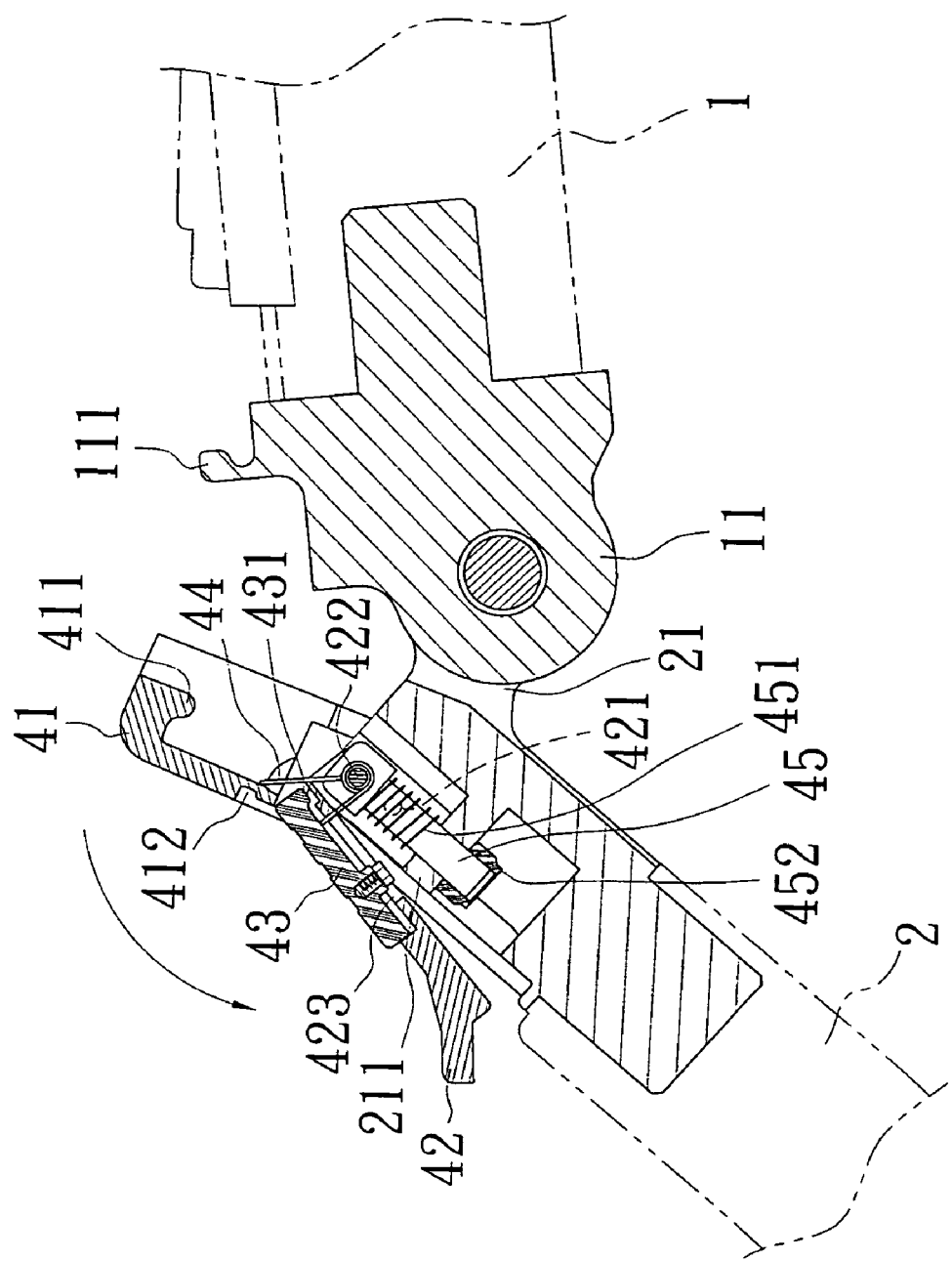
FIG. 7 is a side view of the fixing device, taken when the fixing device is being moved so as to unfasten the chassis (step three)
Figure 8:
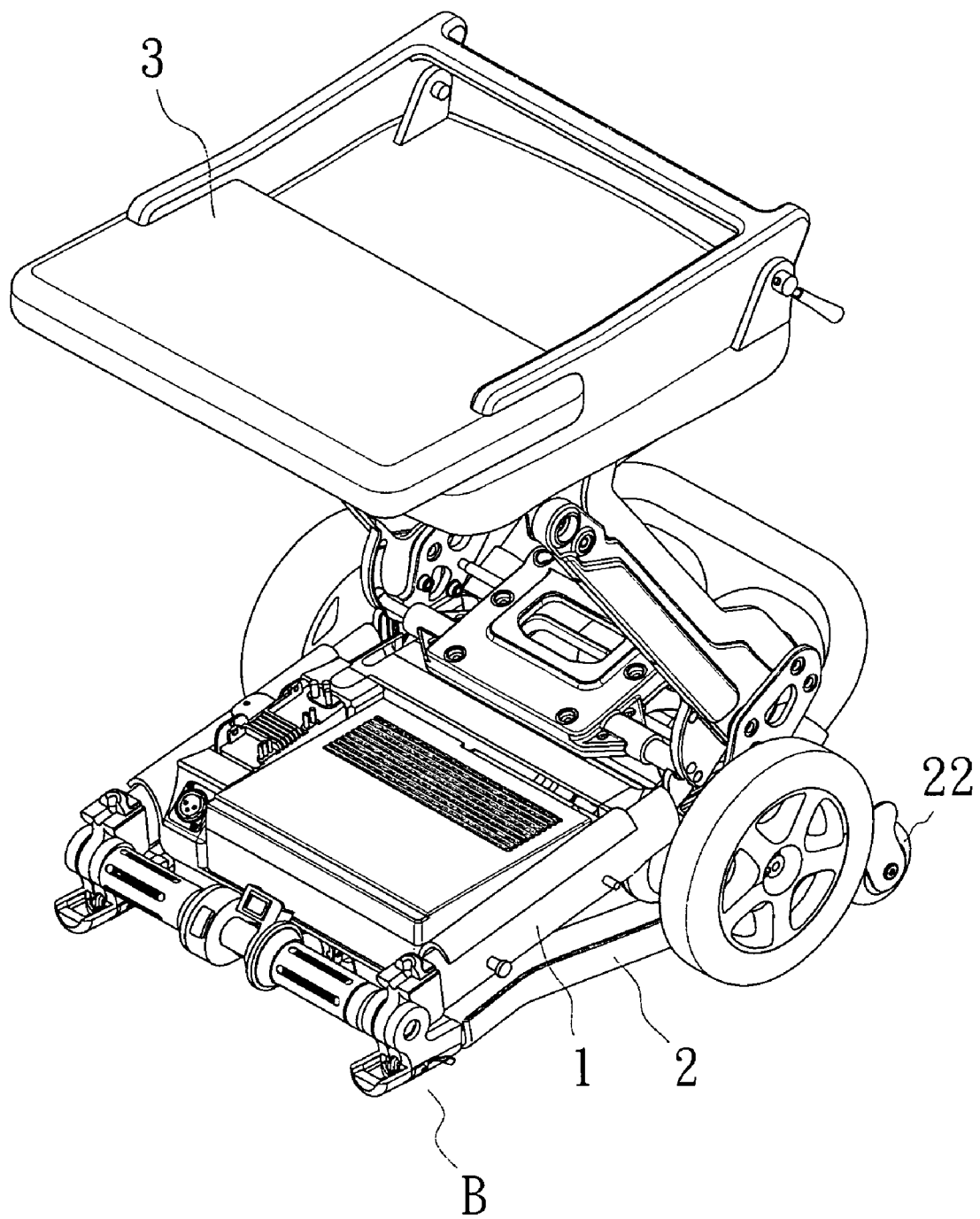
FIG. 8 is a perspective view of the walk-substituting vehicle under a folding action (step two)

Referring to FIG. 1 to FIG. 3, a preferred embodiment (A) of an electric walk-substituting vehicle of the present invention includes:

a chassis, which consists of a main part 1, and a footrest part 2 pivoted on a front end of the main part 1; the main part 1 of the chassis has a pivotal member 11 on a front end thereof while the footrest part 2 has a pivotal member 21 on a rear end, and it is pivoted to the pivotal member 11 of the main part 1 at the pivotal member 21 thereof;

a seat assembly 3 pivoted on an upper side of the main part 1 of the chassis;

a steering mechanism 5 pivoted on a front end of the footrest part 2 of the chassis;

a fixing device (B) for the chassis; the fixing device (B) consists of:

(a) a detaining protrusion 111 formed on an upper end of the pivotal member 11 of the main part 1;

(b) a pulling member 42, which has first and second pivotal holes 421 and 422 thereon; the pulling member 42 has a receiving recessed portion 423 thereon;

(c) a joining member 41, which has a hooked part 411 on a rear end, and an embedding recessed portion 412 on a front end thereof; the joining member 41 is pivoted on the first pivotal hole 421 of the pulling member 42, and the pulling member 42 is pivoted on the footrest part 2 of the chassis at the second pivotal hole 422 thereof so that an upward pivotal motion of the pulling member 42 will cause the rear hooked part 411 of the joining member 41 to separate from the detaining protrusion 111 formed on the upper end of the pivotal member 11 of the main part 1 of the chassis;

(d) a pushing member 43, which is received in and can slide along the receiving recessed portion 423 of the pulling member 42; the pushing member 43 has an embedded portion 431 on one end thereof, which will be embedded in the embedding recessed portion 412 of the joining member 41 when the fixing device (B) is in a fastening position; and (e) a returning elastic element 44, which is joined on the pivotal joint between the pulling member 42 and the footrest part 2 of the chassis with two ends thereof being pressed against the pushing member 43 and the joining member 41 respectively.

Referring to FIG. 1 to FIG. 3, the walk-substituting vehicle is in an unfolded in-use configuration, wherein the seat assembly 3 and the steering mechanism 5 are in the erected position, and the chassis in a spread-out position with the footrest part 2 being in front of the main part 1, and with the fixing device (B) fastening the footrest part 2 to the main part 1 so as to prevent the chassis from folding; when the fixing device (B) is in the fastening position, the joining member 41 will be in a horizontal position with the hooked part 411 being detained by the detaining protrusion 111, the pulling member 42 also in a horizontal position to pull the joining member 41 so as to make the hooked part 411 firmly detained by the detaining protrusion 111, and the embedded portion 431 of the pushing member 43 will be embedded in the embedding recessed portion 412 of the joining member 41 so as to prevent the joining member 41 from pivoting relative to the pulling member 42. Consequently, the footrest part 2 can't be pivoted relative to the main part 1; in other words, the chassis can't be folded.

Figure 9:
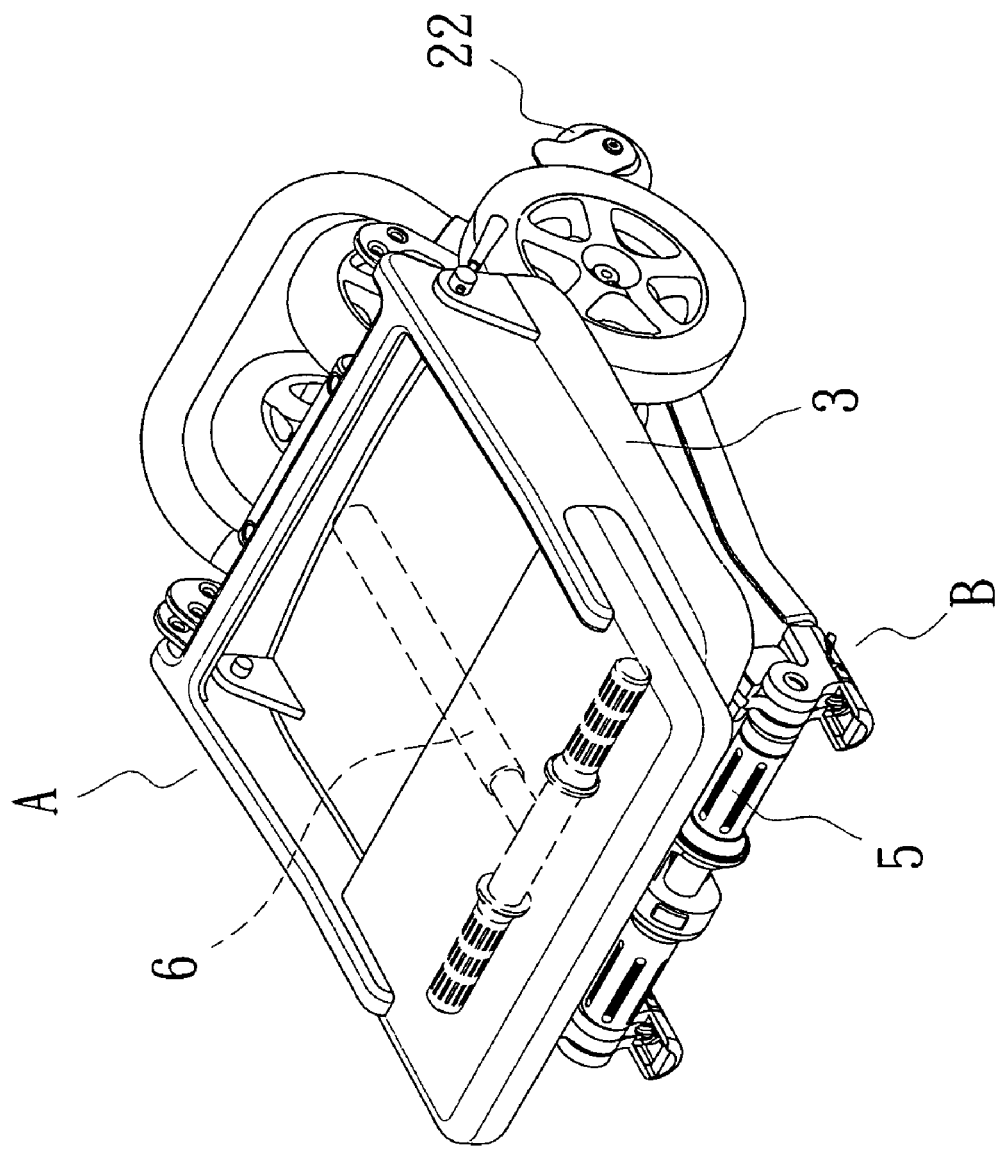
FIG. 9 is a perspective view of the walk-substituting vehicle under a folding action (step three)

Referring to FIG. 4 to FIG. 9, the walk-substituting vehicle is moved to the folded not-in-use configuration according to the following steps: first, the steering mechanism 5 is pivoted down to be received in the footrest part 2 of the chassis, and the seat assembly 3 is pivoted down to be close to the upper side of the main part 1 of the chassis; second, the pushing member 43 of the fixing device (B) is pushed forwards to separate the embedded portion 431 from the embedding recessed portion 412 of the joining member 41; third, the pulling member 42 is pivoted upwards from the original horizontal position so as to change the position of the first pivotal hole 421 of the pulling member 42, on which the joining member 41 is pivoted, such that the hooked part 411 of the joining member 41 is away from the detaining protrusion 111, no longer hooked over the detaining protrusion 111, and in turn the returning elastic element 44 forces the joining member 41 to pivot upwards to an unfastening position, thus allowing the chassis to be folded; finally, the footrest part 2 is pivoted relative to the main part 1 of the chassis so that the electric walk-substituting vehicle (A) is in the folded not-in-use configuration, as shown in FIG. 9.

Furthermore, a plate part 211 protrudes from the footrest part 2 of the chassis while a threaded rod 45 is joined on the pivotal joint between the pulling member 42 and the footrest part 2 of the chassis, and passed through an elastic element 451 as well as the plate part 211, and it is threadedly joined to a threaded fixing element 452; thus, the user can turn the threaded fixing element 452 so as to move the threaded rod 45 relative to the plate part 211, thus changing the position of the hooked part 411 of the joining member 41 in relation to the detaining protrusion 111. In other words, the user is allowed to turn the threaded fixing element 452 so as to adjust the tightness of the joining member 41 hooked over the detaining protrusion 111.

Figure 10:
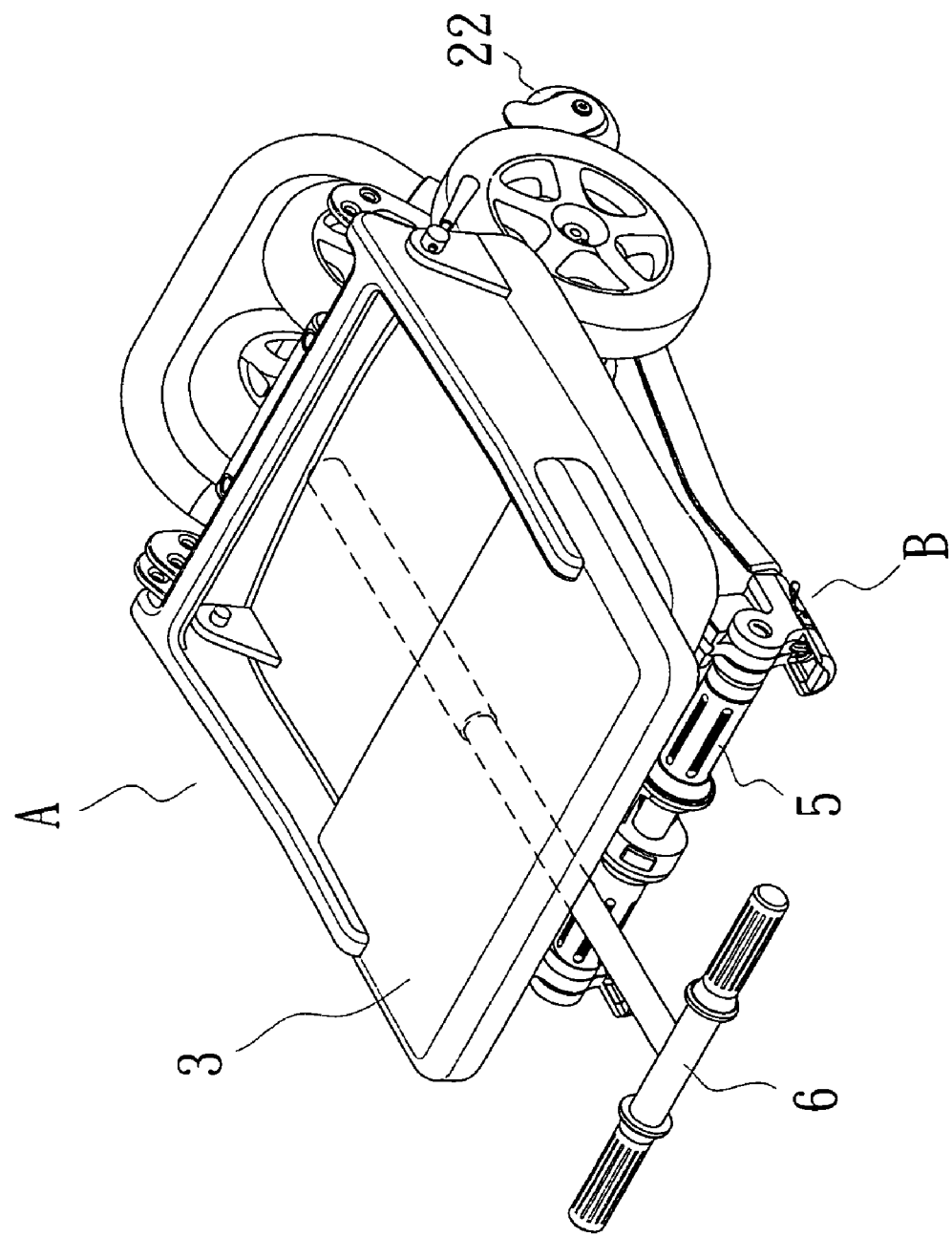
FIG. 10 is a perspective view of the walk-substituting vehicle in the draggable folded position.

Referring to FIG. 10, the vehicle (A) further includes an auxiliary handle 6, and two auxiliary wheels 22; the auxiliary handle 6 is telescopic, and joined on a lower side of a seat of the seat assembly 3 while the auxiliary wheels 22 are joined on two sides of the footrest part 2 of the chassis. Thus, the vehicle (A) can be easily dragged like a luggage trolley on the auxiliary wheels 22 after the vehicle (A) is moved to the folded position and the auxiliary handle 6 is stretched to stick out from under the seat.

From the above description, it can be seen that the present invention has the following advantages over the prior arts:

1. When the walk-substituting vehicle is in the unfolded in-use position, the joining member of the fixing device will be hooked over the detaining protrusion formed on the pivotal member of the main part of the chassis so as to fasten the footrest part to the main part of the chassis.

2. The fixing device will move to the unfastening position to allow the chassis to be folded as soon as the pushing member is pushed rearwards and the pulling member pivoted upwards. Therefore, the fixing device is easy to use.

3. A person is allowed to adjust the tightness of the joining member hooked over the detaining protrusion on the pivotal member of the main part of the chassis by means of turning the threaded fixing element joined on the threaded rod. In other words, the firmness of the fixing device joined on the detaining protrusion can be adjusted.

4. The electric walk-substituting vehicle can be moved to a not-in-use position to be easy to store and transport. Furthermore, the vehicle consists of the auxiliary handle, and the auxiliary wheels, which allow the vehicle to be easily dragged like a luggage trolley after the vehicle is folded.

What is claimed is:

1. A fixing device for a foldable chassis of an electric walk-substituting vehicle, the vehicle comprising:
   a chassis including a main part and a footrest part pivoted to the main part; the main part of the chassis having a pivotal member;
   a steering mechanism pivoted on a front end of the footrest part;
   a seat assembly pivoted on an upper side of the main part of the chassis; and
   a fixing device; the fixing device being positioned next to a pivotal joint between the main part and the footrest part of the chassis to fasten the footrest part to the main part of the chassis when the chassis is in an unfolded in-use position; the fixing device including
   (a) a detaining protrusion formed on an upper end of the pivotal member of the main part of the chassis;
   (b) a pulling member; the pulling member having first and second pivotal holes thereon; the pulling member having a receiving recessed portion thereon; the pulling member being pivoted on the footrest part of the chassis at the second pivotal hole thereof;
   (c) a joining member pivoted on the first pivotal hole of the pulling member; the joining member having a hooked part on one end, and an embedding recessed portion on other end thereof;
   (d) a pushing member received in the receiving recessed portion of the pulling member; the pushing member being capable of being slid along the receiving recessed portion; the pushing member having an embedded portion on one end thereof; and
   (e) a returning elastic element joined on the pivotal joint between the pulling member and the footrest part of the chassis with two ends thereof exerting force on the pushing member and the joining member respectively;

the fixing device being movable to a fastening position to fasten the footrest part to the main part of the chassis when the chassis is in said unfolded in-use position, wherein the hooked part of the joining member will be hooked over the detaining protrusion, and the embedded portion of the pushing member embedded in the embedding recessed portion of the joining member.

2. The fixing device for a foldable chassis of an electric walk-substituting vehicle as claimed in claim 1 further comprising:

a threaded rod joined on the pivotal joint between the pulling member and the footrest part of the chassis; the threaded rod being passed through a plate part protruding from the footrest part of the chassis;

an elastic element positioned around the threaded rod; and a threaded fixing element threadedly joined on the threaded rod.

3. The fixing device for a foldable chassis of an electric walk-substituting vehicle as claimed in claim 1, wherein the electric walk-substituting vehicle further includes an auxiliary handle, and plural auxiliary wheels to allow the vehicle to be dragged in a folded not-in-use configuration; the auxiliary handle being joined on a lower side of the seat assembly; the auxiliary wheels being joined on the footrest part of the chassis.

* * * * *